United States Patent
Sultan et al.

(10) Patent No.: US 12,391,823 B2
(45) Date of Patent: Aug. 19, 2025

(54) POLYETHYLENE COMPOSITION FOR IMPROVING ADHESION TO POLYURETHANE RESINS

(71) Applicant: Borealis AG, Vienna (AT)

(72) Inventors: Bernt-Ake Sultan, Stenungsund (SE); Jonas Junqvist, Stenungsund (SE); Elisabeth Ribarits, Stenungsund (SE)

(73) Assignee: BOREALIS AG, Vienna (AT)

( * ) Notice: Subject to any disclaimer, the term of this patent is extended or adjusted under 35 U.S.C. 154(b) by 704 days.

(21) Appl. No.: 17/441,461

(22) PCT Filed: Apr. 28, 2020

(86) PCT No.: PCT/EP2020/061723
§ 371 (c)(1),
(2) Date: Sep. 21, 2021

(87) PCT Pub. No.: WO2020/221728
PCT Pub. Date: Nov. 5, 2020

(65) Prior Publication Data
US 2022/0162429 A1 May 26, 2022

(30) Foreign Application Priority Data

Apr. 30, 2019 (EP) ..................................... 19171891

(51) Int. Cl.
| | | |
|---|---|---|
| H01B 3/44 | (2006.01) | |
| C08L 23/0846 | (2025.01) | |
| C08L 33/10 | (2006.01) | |
| H01B 7/02 | (2006.01) | |
| C08L 33/08 | (2006.01) | |
| H01B 3/30 | (2006.01) | |
| H01B 7/00 | (2006.01) | |

(52) U.S. Cl.
CPC .......... *C08L 23/0846* (2013.01); *H01B 3/441* (2013.01); *H01B 3/447* (2013.01); *C08L 33/08* (2013.01); *C08L 33/10* (2013.01); *C08L 2203/202* (2013.01); *C08L 2205/02* (2013.01); *C08L 2205/035* (2013.01); *H01B 3/302* (2013.01); *H01B 7/00* (2013.01); *H01B 7/0216* (2013.01)

(58) Field of Classification Search
CPC ................. C08L 23/0869; C08L 23/08; C08L 2203/202; H01B 3/44; H01B 3/441; H01B 3/447; H01B 3/302; H01B 7/00; H01B 7/0216
See application file for complete search history.

(56) References Cited

U.S. PATENT DOCUMENTS

| | | | | |
|---|---|---|---|---|
| 6,667,098 B1 * | 12/2003 | Eklind | ..................... | H01B 3/46 |
| | | | | 428/447 |
| 7,435,908 B2 * | 10/2008 | Jungkvist | ............... | H01B 3/447 |
| | | | | 174/110 R |
| 10,529,462 B2 * | 1/2020 | Angerer | ................. | H01B 13/06 |
| 11,488,744 B2 * | 11/2022 | Sugita | .................... | H01B 7/292 |
| 2016/0053079 A1 | 2/2016 | Shuichi | | |
| 2022/0177680 A1 * | 6/2022 | Fossum | .................. | H01B 3/448 |

FOREIGN PATENT DOCUMENTS

| | | | | | |
|---|---|---|---|---|---|
| CN | 107112090 A | * | 8/2017 | ............. | H01B 11/02 |
| DE | 102015012261 A1 | * | 5/2016 | ............. | H01B 3/30 |
| EP | 1235232 A1 | | 8/2002 | | |
| EP | 1398797 A1 | | 3/2004 | | |
| EP | 1528574 A1 | | 5/2005 | | |
| EP | 2077295 B1 | | 8/2009 | | |
| JP | 4-359026 A | * | 12/1992 | ............. | C08J 5/00 |
| JP | 05179080 A | * | 7/1993 | ............. | C08L 23/08 |
| JP | 2002060568 A | * | 2/2002 | | |
| WO | WO-9834236 A1 | * | 8/1998 | ............. | H01B 1/24 |
| WO | WO 2000/068957 A1 | | 11/2000 | | |
| WO | WO-2010018061 A1 | * | 2/2010 | ............ | C09J 7/0296 |
| WO | WO 2015/200015 A1 | | 12/2015 | | |

OTHER PUBLICATIONS

JP 4-359026 A (Dec. 11, 1992); machine translation. (Year: 1992).*
International Search Report dated Jun. 23, 2020 in PCT/EP2020/061723.

* cited by examiner

*Primary Examiner* — Rip A Lee
(74) *Attorney, Agent, or Firm* — Lippes Mathias LLP

(57) ABSTRACT

The present invention concerns a polyethylene composition comprising (A) an ethylene co-polymer containing monomer units with hydrolysable silane-groups, and (B) one or more ethylene co-polymers selected from the group of (B1) an ethylene co-polymer containing monomer units with hydroxyl groups, (B2) an ethylene co-polymer containing monomer units with (meth-)acrylate groups, and (B3) an ethylene co-polymer containing monomer units with hydroxyl groups and (meth-)acrylate groups, a cable comprising a layer (1) which comprises one or more ethylene copolymers selected from the group of (B1), (B2) and (B3) and to the use of one or more ethylene co-polymers selected from the group of (B1), (B2) and (B3) for improving the adhesion between a layer of a cable comprising the ethylene co-polymer(s) and a polyurethane resin.

13 Claims, No Drawings

POLYETHYLENE COMPOSITION FOR IMPROVING ADHESION TO POLYURETHANE RESINS

This is a 371 of PCT Application No. PCT/EP2020/061723, filed Apr. 28, 2020, which claims the benefit of European Application No. 19171891.5, filed Apr. 30, 2019, the contents of which are incorporated herein in their entirety.

The present invention relates to a polyethylene composition comprising one or more specific ethylene co-polymer(s), in particular a polyethylene composition comprising one or more ethylene co-polymers for improving the adhesion between a layer of a cable comprising ethylene co-polymer(s) and a polyurethane resin (PUR). The present invention further relates to a cable comprising a layer comprising one or more of said ethylene co-polymers and to the use of one or more of said ethylene co-polymers for improving the adhesion between a layer of a cable comprising ethylene co-polymer(s) and a polyurethane resin (PUR).

In the field of power cables, such as low voltage (LV) cables, often polyurethane cast resins (PUR) are used when jointing such cables. While PVC, which is a common material used for layers in power cables, has an excellent adhesion towards PUR, polyolefins, and amongst them ethylene vinylsilane ethylene copolymers, show almost no adhesion at all towards such jointing material.

As polyolefins are also frequently used as layers in power cables there is a need to provide polyolefin, in particular polyethylene, compositions or power cables in which layers comprising polyolefins, in particular polyethylenes, are contained with an enhanced adhesion towards PURs.

The present invention is based on the finding that this object can be achieved if a polyethylene composition is used for producing the cable/a layer of the cable which comprises both an ethylene co-polymer containing hydrolysable silane-groups and an ethylene co-polymer with monomer units comprising hydroxyl groups and/or (meth-)acrylate groups, and/or if a cable comprises a layer which comprises an ethylene co-polymer with monomer units comprising hydroxyl groups and/or (meth-)acrylate groups.

The present invention therefore, first, provides a polyethylene composition comprising
- (A) an ethylene co-polymer containing monomer units with hydrolysable silane-groups, and
- (B) one or more ethylene co-polymers selected from the group of
  - (B1) an ethylene co-polymer containing monomer units with hydroxyl groups,
  - (B2) an ethylene co-polymer containing monomer units with (meth-)acrylate groups, and
  - (B3) an ethylene co-polymer containing monomer units with hydroxyl groups and (meth-)acrylate groups.

The term "ethylene co-polymer" as used herein is intended to denote a polymer of ethylene in which one or more other type(s) of monomer units than ethylene are present.

Components (A) and (B) may be present in the composition as separate ethylene co-polymers or as one ethylene co-polymer containing the respective groups/monomer units simultaneously.

For example, the polyethylene composition may comprise (A) and (B1) in the form of one ethylene co-polymer comprising hydrolysable silane-groups and monomer units having hydroxyl groups. In the case of (A) and (B3) this may be one ethylene co-polymer comprising hydrolysable silane-groups and monomer units having both hydroxyl groups and (meth-)acrylate groups The term "(meth)acrylate" is intended to encompass both "acrylate" and "methacrylate".

Component (A) is an ethylene co-polymer containing monomer units with hydrolysable silane-groups. It is known to cross-link polyolefins by means of additives as this improves the properties of the polyolefin such as mechanical strength and chemical heat resistance. Cross-linking may be performed by condensation of silanol groups contained in the composition which can be obtained by hydrolysation of silane groups. A silane-group containing compound can be introduced as a cross-linkable group e.g. by grafting the silane compound onto a polyolefin, i.e. by chemical modification of the polymer by addition of silane groups mostly in a radical reaction, or by copoly-merisation of olefin monomers and silane-group containing monomers. Such techniques are known e.g. from U.S. Pat. Nos. 4,413,066, 4.297,310, 4,351,876, 4,397,981, 4,446,283 and 4,456,704. If using a graft polymer, this may have been produced e.g. by any of the two methods described in U.S. Pat. Nos. 3,646,155 and 4,117,195, respectively.

Preferably, the silane group containing ethylene co-polymer has been obtained by co-polymerisation. The co-polymerisation is preferably carried out with an unsaturated silane compound represented by the formula

$$R^1 SiR^2_q Y_{3-q} \quad (V)$$

wherein
- $R^1$ is an ethylenically unsaturated hydrocarbyl, hydrocarbyloxy or (meth)acryloxy hydrocarbyl group,
- $R^2$ is an aliphatic saturated hydrocarbyl group,
- Y which may be the same or different, is a hydrolysable organic group and
- q is 0, 1 or 2.

Special examples of the unsaturated silane compound are those wherein R1 is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and R2, if present, is a methyl, ethyl, propyl, decyl or phenyl group.

A preferred unsaturated silane compound is represented by the formula

$$CH_2=CHSi(OA)_3 \quad (VI)$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyl-trimethoxysilane, gamma (meth)acryloxypropyltriethoxysilane, and vinyl triacetoxysilane.

The silane-group containing ethylene co-polymer preferably contains 0.001 to 15 wt. % of monomer units with hydrolysable silane groups, more preferably 0.01 to 5 wt. %, and most preferably 0.1 to 2 wt. %.

Preferably, in the composition the monomer units with hydrolysable silane-group are present in an amount of 0.1 to 1 mol. %, more preferably of 0.15 to 0.8 mol. %, and most preferably of 0.2 to 0.5 mol. %

For cross-linking of such ethylene co-polymers comprising silanol groups, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463 or in EP 1 309 631 and EP 1 309 632.

In a preferred embodiment of the invention, the polyethylene composition further comprises a silanol condensation catalyst.

The currently most preferred compounds are dodecyl benzene sulphonic acid and tetrapropyl benzene sulphonic acid.

Preferably, in the polyethylene composition the silanol condensation catalyst is present in an amount of 0.0001 to 6 wt. %, more preferably of 0.001 to 2 wt. %, and most preferably 0.02 to 0.5 wt. %.

In a preferred embodiment, component (B) is present in an amount of 2 wt. % or more, more preferably of 4 wt. % or more, and still more preferably of 5 wt. % or more in the total polyethylene composition.

Furthermore, it is preferred that component (B) is present in an amount of 35 wt. % or less, more preferably of 30 wt. % or less, and most preferably of 25 wt. % or less in the total polyethylene composition.

In one embodiment, component (B) comprises, or consists of, component (B3), i.e. an ethylene co-polymer containing monomer units with hydroxyl groups and (meth-)acrylate groups.

In said ethylene co-polymer both hydroxyl groups and (meth-)acrylate groups may be present at the same monomer units, or may be present in separate monomer units.

Preferably, in component (B3) both hydroxyl groups and (meth-)acrylate groups are present at the same monomer units, more preferably, component (B3) comprises, or consists of, an ethylene co-polymer containing (meth-) acrylic acid ester wherein the alcohol component of the ester contains a hydroxyl group, and still more preferably, an ethylene co-polymer containing hydroxyalkyl (meth-)acrylate monomer units.

In a particularly preferred embodiment, component (B3) comprises, or consist of, an ethylene co-polymer containing hydroxyalkyl (meth-)acrylate monomer units wherein the alkyl-group is a $C_1$- to $C_4$-alkyl group, in particular is methyl, ethyl or propyl.

Further preferred, in component (B3) the monomer units having both hydroxyl groups and (meth-)acrylate groups are present in the ethylene co-polymer in an amount of 1.0 mol. % or more, i.e. both hydroxyl groups and (meth-)acrylate groups are each present in the ethylene co-polymer in an amount of 1.0 mol. % or more, more preferably of 1.5 mol. % or more, and still more preferably of 2.0 mol. % or more.

Further preferred, in component (B3) the monomer units having both hydroxyl groups and (meth-)acrylate groups are present in the ethylene co-polymer in an amount of 10 mol. % or less, i.e. both hydroxyl groups and (meth-)acrylate groups are each present in the ethylene co-polymer in an amount of 10 mol. % or less, more preferably of 7 mol. % or less, and still more preferably of 5 mol. % or less, and most preferably 3 mol. % and less.

Further preferred, component (B3) is present in the composition in an amount so that the monomer units having both hydroxyl groups and (alkyl-)acrylate groups are present in the composition in an amount of 0.14 mol. % or more i.e. both hydroxyl groups and (meth-)acrylate groups are each present in the composition in an amount of 0.14 mol. % or more, more preferably of 0.16 mol. % or more, still more preferably of 0.2 mol. % or more, and most preferably of 0.25 mol. % or more.

Further preferred, component (B3) is present in the composition in an amount so that the monomer units having both hydroxyl groups and (alkyl-)acrylate groups are present in the composition in an amount of 7 mol. % or less i.e. both hydroxyl groups and (meth-)acrylate groups are each present in the composition in an amount of 7 mol. % or less, more preferably of 5 mol. % or less, still more preferably of 4 mol. % or less, and most preferably of 3 mol. % or less.

In a further embodiment, component (B) comprises, or consists of, component (B1), i.e. an ethylene co-polymer containing monomer units with hydroxyl groups.

In this embodiment component (B1) preferably comprises, or consists of, an ethylene vinyl alcohol co-polymer.

Preferably, the vinyl alcohol comonomer units are present in the ethylene vinyl alcohol co-polymer in an amount of 10 mol. % or more, more preferably 15 mol. % or more, still more preferably 18 mol. % or more and most preferably 20 mol. % or more.

Preferably, the vinyl alcohol cornonomer units are present in the ethylene vinyl alcohol co-polymer in an amount of 50 mol. % or less, more preferably 45 mol. % or less, still more preferably 40 mol. % or less and most preferably 38 mol. % or less.

In still a further embodiment, component (B) comprises, or consists of, component (B2).

Preferably, component (B2) comprises, or consists of, an ethylene co-polymer containing monomer units having methyl-, ethyl-, propyl- or butyl-acrylate groups.

In component (B2) the monomer units having (meth-) acrylate groups are preferably present in the ethylene co-polymer in an amount of 2.5 mol. % or more, more preferably of 3 mol. % or more, more preferably of 3.5 mol. % or more, more preferably of 4.25 mol. % or more, more preferably of 4.5 mol. % or more, more preferably of 5 mol. % or more, more preferably of 5.5 mol. % or more, more preferably of 6 mol. % or more, and most preferably of 7 mol. % or more.

In component (B2) the monomer units having (meth-) acrylate groups are preferably present in the ethylene co-polymer in an amount of 15 mol. % or less, more preferably of 10 mol. % or less, and still more preferably of 8 mol. % or less.

Preferably, component (B2) is present in the composition in an amount so that the monomer units having (meth-) acrylate groups are present in the composition in an amount of 1.0 mol. % or more, more preferably of 1.5 mol. % or more, and still more preferably of 2.0 mol. % or more.

Preferably, component (B2) is present in the composition in an amount so that the monomer units having (meth-) acrylate groups are present in the composition in an amount of 14 mol. % or less, more preferably of 9 mol. % or less, and still more preferably of 7 mol. % or less.

Component (B2) has preferably been produced in a tubular reactor.

In a preferred embodiment, the adhesion strength between the composition and a standard polyurethane resin according to standard test as defined in the experimental section below is at least 1 N/mm. Typically, the adhesion strength is not more than 50 N/mm, preferably not more than 25 N/mm The standard polyurethane resin according to the present application is Protolin 2000, commercially available from Lovink-Enertech In one embodiment, components (A) and (B), in any of the above-described embodiments, make up at least 85 wt. % of the polyethylene composition of the invention, in a further embodiment make up at least 90 wt. % of the composition, and in still a further embodiment make up at least 95 wt. % of the composition.

The present invention furthermore relates to a cable comprising a layer (1) which comprises, or consists of, one or more ethylene co-polymers selected from the group of
(B1) an ethylene co-polymer containing monomer units with hydroxyl groups,
(B2) an ethylene co-polymer containing monomer units with (meth-) acrylate groups, and
(B3) an ethylene co-polymer containing monomer units with hydroxyl groups and (meth-)acrylate groups.

All embodiments and preferred embodiments as described for components (B1), (B2) and (B3) hereinbefore apply also to components (B1), (B2) and (B3) of the layer (1) of the cable of the invention.

For example, the cable may comprise a layer (1) which comprises, or consists of, component (B2) in any of the embodiments as described herein, wherein the layer is a skin layer (i.e. the outermost layer of the cable).

In a preferred embodiment, the adhesion strength between the cable and a standard polyurethane resin according to standard test as defined in the experimental section below is at least 1 N/mm.

In one embodiment, the one or more ethylene co-polymers selected from the group of (B1), B2) and (B3) in any of the above-described embodiments, make up at least 85 wt. % of layer (1), in a further embodiment make up at least 90 wt. % of layer (1), and in still a further embodiment make up at least 95 wt. % of layer (1).

In a preferred embodiment, layer (1) comprises, or consists of, the polyethylene composition according to the present invention in any of the above-described embodiments.

For example, the cable may comprise a layer (1) which comprises, or consists of, a polyethylene composition comprising, or consisting of, components (A) and (B2) in any of the embodiments as described herein, wherein the layer is a skin layer (i.e. the outermost layer of the cable), and wherein (A) and (B2) may be present in the composition as a ethylene co-polymer comprising both monomer units with hydrolysable silane groups and monomer units with (meth-) acrylate groups.

In the cable of the invention further layer(s) adjacent to layer (1) may be present which may comprise, or consist of, an ethylene copolymer with hydrolysable silane-groups, a polypropylene, a polyethylene, such as a LLDPE or a HDPE, and/or a thermoplastic.

Preferably, in the cable according to the invention a further layer is present adjacent to layer (1) which comprises, or consists of, a polyethylene containing hydrolysable silane-groups.

Layer (1) is preferably a skin layer and/or insulation layer, more preferably is a skin layer.

Preferably, the cable of the invention is a power cable, e.g. a low voltage power cable.

The present invention furthermore relates to the use of one or more ethylene co-polymers selected from the group of
(B1) an ethylene co-polymer containing monomer units with hydroxyl groups,
(B2) an ethylene co-polymer containing monomer units with (meth-) acrylate groups, and
(B3) an ethylene co-polymer containing monomer units with hydroxyl groups and (meth-)acrylate groups,
in any of the embodiments as described herein, for improving the adhesion between a layer of a cable comprising the ethylene co-polymer(s) and a polyurethane resin.

The present invention furthermore relates to the use of an ethylene co-polymer containing monomer units with (meth-)acrylate groups in an amount of more than 4 mol. % to 15 mol. % or less for improving the adhesion between a layer of a cable comprising the ethylene co-polymer and a polyurethane resin. All embodiments of the ethylene co-polymer containing monomer units with meth-)acrylate groups as described above are also preferred embodiments of the use of the ethylene co-polymer containing monomer units with (meth-) acrylate groups.

Preferably, the monomer units with (meth-)acrylate groups are present in an amount of 4.25 mol. % or more, more preferably of 4.5 mol. % or more, more preferably of 5 mol. % or more, more preferably of 5.5 mol. % or more, more preferably of 6 mol. % or more, more preferably of 7 mol. % or more, and most preferably 8 mol. % or more, in the ethylene co-polymer containing monomer units with (meth-)acrylate groups.

Preferably, the monomer units with (meth-)acrylate groups are present in an amount of 12.5 mol. % or less, more preferably 10 mol. % or less, in the ethylene co-polymer containing monomer units with (meth-)acrylate groups.

Preferably, the ethylene co-polymer contains monomers having methyl-, ethyl-propyl- or butyl acrylate groups, more preferably methyl acrylate groups.

Preferably, the ethylene co-polymer further contains monomer units with hydrolysable silane-groups. Especially, it is preferable that the monomer units with hydrolysable silane-groups are present in the ethylene co-polymer in an amount of 0.1 to 1 mol. %, more preferably in an amount of 0.2 to 0.7 mol. %, and most preferably in an amount of 0.3 to 0.5 mol. %.

Furthermore, said monomer units with hydrolysable silane-groups may comprise, or consist of, vinyl trimethoxysilane, vinyl bismethoxyethoxysilane, vinyl triethoxysilane, gamma-(meth)acryloxypropyltrimethoxysilane, gamma(meth)acryloxypropyltriethoxysilane, and/or vinyl triacetoxysilane.

In a preferred embodiment of the invention, the monomer units with hydrolysable silane-groups comprise, or consist of, vinyl trimethoxysilane.

EXAMPLES

1. Determination Methods a) Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer.

The $MFR_2$ of polyethylene (co-)polymers is measured at a temperature 190° C. and at a load of 2.16 kg.

b) Adhesion Strength

The adhesion strength is measured according to standard HD 603 S1/A3:2008, see part 5, section G. This standard prescribes a minimum adhesion strength of 1 N/mm width of cable sample between the cable insulation and the joint cast resin (commonly Polyurethane but also epoxy based is existing).

The data in this invention is based on adhesion to tape samples with a thickness of 0.5 mm and a length of 30 cm.

The tapes are prepared on a Collin TeachLine E20T tape extruder with a 4.2:1, 20D Compression screw, D=20 mm, with a temperature profile of 135/165/755° C. at 30 rpm. The tape samples are then conditioned for at least 24 hours in 23° C. and 59% relative humidity and then cleaned with IPA.

The conditioned tapes are placed on plaques made of HDPE. The plaques contain openings with a width of 10 mm, length of 150 mm and depth of 15 mm. The tape samples are placed above the openings. The tapes are fixed above the openings by another HDPE plaque. The PUR is mixed with the hardener and poured in the openings. The mould is then conditioned for 24 hours. The PUR crosslink and hardened during that time. The tape and the PUR sample is removed from the holder and the adhesion force measured in a tensile tester with a special sample holder as described in VDE 0472-633.

The master-batch (MB-CAT) was dry-blended with the polymers/compounds outlined in table 1 and 2. Thereafter 1.8 mm thick tape was extruded with a temperature profile of 135/145/155° C. with 30 rpm on a Collin TeachLine E20T tape extruder with a 4.2:1, 20D Compression screw, D=20 mm.

2. Experimental Methods a) Crosslinking

Samples containing the crosslinking catalyst master-batch CM-A were crosslinked in 90° C. water for 24 h prior conditioning for the adhesion test. CM-A was dry-blended into the specific polymer mixture of choice prior the tape extrusion step.

3. Materials a) Ethylene Co-Polymers

The ethylene co-polymers with the type and amount of comonomer(s) indicated used in the present invention are given in Table 1 below. Nucrel 0903HC, Nucrel 1202, Surlyn 9320, Surlyn 8320, Escor 6060, Escorene UL00119, Levapren 400, EVAL G156B and EVAL F101A are ethylene co-polymers commercially available from the suppliers as indicated. In table 1 below. Polymer C and D are terpolymers.

Polymer A-F were produced in a 660 m long split feed high pressure tubular reactor (Union Carbide type A-1). The inner wall diameter is 32 mm. Chain transfer agent (propylene), initiators (t-butylperoxy 2-ethylhexanoate (Luperox 26) and air) and co-monomers were added to the reactor in a conventional manner. Polymerization pressure were 230 MPa for all polymers. The maximum polymerization temperature was 310° C. for polymer A and B, 285° C. for Polymer C-G.

TABLE 1

Ethylene co-polymers

| Name | Type(s) | Comonomer(s) Content, wt. % | Content, mol. % | MFR$_2$, g/10 min | Supplier |
|---|---|---|---|---|---|
| Polymer A | VTMS | 1.2 | 0.23 | 0.9 | Borealis |
| Polymer B | VTMS | 1.9 | 0.37 | 0.9 | Borealis |
| Polymer C | BA/VTMS | 4/1.2 | 0.90/0.24 | 0.9 | Borealis |
| Polymer D | MA/VTMS | 22.5/1.4 | 8.7/0.32 | 3.5 | Borealis |
| Polymer E | BA | 17 | 4.2 | 1.5 | Borealis |
| Polymer F | MA | 20 | 7.4 | 7.5 | Borealis |
| Polymer G | HEMA | 8 | 2.6 | 1.2 | Borealis |

TABLE 1-continued

Ethylene co-polymers

| Name | Type(s) | Comonomer(s) Content, wt. % | Content, mol. % | MFR$_2$, g/10 min | Supplier |
|---|---|---|---|---|---|
| Nucrel 0903HC | MAA | 9 | 3.0 | 3 | Du Pont |
| Nucrel 1202 | MAA | 12 | 4.3 | 1.5 | Du Pont |
| Surlyn 9320 | Zn-ionomer | n.a. | n.a. | 0.8 | Du Pont |
| Surlyn 8320 | Na-ionomer | n.a. | n.a. | 1 | Du Pont |
| Escor 6060 | AA | 8.5 | 3.5 | 8 | Exxon |
| Escorene UL00109 | VA | 9 | | 0.7 | Exxon |
| Escorene UL00119 | VA | 19 | 7.1 | 0.7 | Exxon |
| Levapren 400 | VA | 40 | 18 | 3 | Lanxess |
| EVAL G156B | VOH | 48 | 36 | 6 | Kuraray |
| EVAL F101A | VOH | 32 | 23 | 1.6 | Kuraray |

AA - acrylic acid
BA - butyl acrylate
MA - methyl acrylate
MAA - methyl acrylic acid
HEMA - hydroxy ethyl methacrylate
VA - vinylacetate
VOH - vinylalcohol
VTMS - vinyl trimethoxy silane
n.a. - not available b) Crosslinking Catalyst Master Batch CM-A CM-A consists of a crosslinking catalyst (1 wt. % dibutyl tin dilaurate) and a stabilizer (2 wt. % Irganox 1010) which is compounded into an ethylene butyl acrylate (BA) copolymer with a BA content of 17 wt-% and MFR$_2$=8 g/10 min.

c) Polyurethane Resin (PUR)

The polyurethane resin (PUR) used in the present invention as cable jointing cast resin is Protolin 2000, commercially available from Lovink-Enertech. It is a two component non-filled and non-colored two-component cast resin 4. Results The results of adhesion tests for polyethylene compositions to polyurethane resin Protolin 2000 are shown in Table 2 below. Inventive examples 1E1 to 1E3 are polyethylene compositions comprising polyethylene polymer(s) containing hydrolysable silane-groups (A) and ethylene copolymer(s) (B).

TABLE 2

Adhesion of polyethylene compositions to cable jointing cast resin Protolin 2000

| Example | Ethylene copolymer | Comonomer type(s) | wt. % Active groups | mol. % active groups | Adhesion N/mm |
|---|---|---|---|---|---|
| IE1 | 10 wt. % Polymer G 85 wt.% Polymer B 5 wt. % CM-A | HEMA/VTMS | 0.8/1.7 | 0.26/0.33 | 7.2 |
| IE2 | 15 wt. % Polymer G 80 wt.% Polymer B 5 wt. % CM-A | HEMA/VTMS | 1.2/1.6 | 0.39/0.31 | 9 |
| IE3 | Polymer D | MA/VTMS | 22.5/1.4 | 8.7/0.32 | >10 |
| CE1 | Polymer A | VTMS | 1.2 | 0.23 | 0.1 |
| CE2 | Polymer C | BA/VTMS | 4/1.2 | 0.9/0.24 | 0.4 |

TABLE 2-continued

Adhesion of polyethylene compositions to cable jointing cast resin Protolin 2000

| Example | Ethylene copolymer | Comonomer type(s) | wt. % Active groups | mol. % active groups | Adhesion N/mm |
|---|---|---|---|---|---|
| CE3 | 5 wt. % Polymer G 90 wt. % Polymer B 5 wt. % CM-A | HEMA/ VTMS | 7.6/1.8 | 0.13/0.35 | 0.4 |

The results of adhesion tests for ethylene copolymer(s) (B), which may be used to form layer (1) of the cable of the invention, to polyurethane resin Protolin 2000 are shown in Table 3 below.

TABLE 3

Adhesion of polyethylene copolymers to cable jointing cast resin Protolin 2000

| Example | Ethylene copolymer | Comonomer type(s) | w-% Active groups | Mole-% active groups | Adhesion N/mm |
|---|---|---|---|---|---|
| IE4 | EVAL G156B | VOH | 48 | 36 | >10 |
| IE5 | EVAL F101A | VOH | 32 | 23 | >10 |
| IE6 | Polymer G | HEMA | 8 | 2.6 | >10 |
| IE7 | Polymer F | MA | 20 | 7.4 | 1.9 |
| IE8 | Polymer E | BA | 17 | 4.2 | 1.0 |
| CE4 | Escorene UL00109 | VA | 9 | 3.0 | <0.1 |
| CE5 | Escorene UL00119 | VA | 19 | 7.1 | <0.1 |
| CE6 | Levapren 400 | VA | 40 | 18.0 | <0.1 |
| CE7 | Nucrel 0903 HC | MAA | 9 | 3.0 | <0.1 |
| CE8 | Nucrel 1202 | MAA | 12 | 4.3 | <0.1 |
| CE9 | Escor 6060 | AA | 8.5 | 3.5 | <0.1 |
| CE10 | Surlyn 9320 | Zn-ionomer | n.a. | unknown | <0.1 |
| CE11 | Surlyn 8320 | Na-ionomer | unknown | unknown | <0.1 |

The results presented in tables 2 and 3 show that vinyl trimethoxy silane, vinyl acetate, meth acrylic acid, acrylic acid and ionomer functionalities give no improvement in adhesion towards PUR cast resins (CE 4-11). On the other hand, acrylate (IE3, 7 and 8) and hydroxyl functional copolymers have a great positive effect (IE 4 and 5) and can give adhesion forces by far exceeding 1 N/mm i.e. fulfilling the adhesion requirement of HD603S1. This is also true for copolymers having hydroxy and acrylate functionalities in the same co-monomers (IE1, 2 and 6). It has also been shown that adhesion strength can be reached by using an acrylate or hydroxyl functional polymer as blend into a polyolefin like Polymer A which by itself showing hardly no adhesion towards PUR (IE1).

The invention claimed is:

1. A polyethylene composition comprising
   (A) an ethylene co-polymer containing monomer units with hydrolysable silane groups, and
   (B) one or more ethylene co-polymers wherein at least one hydroxyl group and at least one (meth-)acrylate group are present in the same monomer;
   wherein component (B) is present in the polyethylene composition in an amount so that the monomer units having at least one hydroxyl group and at least one (meth-) acrylate groups are present in the polyethylene composition in an amount of 0.14 mol % or more and 7 mol % or less; and
   wherein components (A) and (B) may be present in the composition as separate ethylene co-polymers or as one ethylene co-polymer containing the respective groups simultaneously wherein component (B) is present in an amount of 4 wt % of more of the total polyethylene composition.

2. Polyethylene composition according to claim 1, wherein component (B) is present in an amount of 35 wt % or less in the total polyethylene composition.

3. Cable comprising a first layer which comprises the polyethylene composition according to claim 1.

4. The cable according to claim 3, wherein the first layer is a skin layer and/or insulation layer.

5. The cable according to claim 3, wherein a second layer which comprises a polyethylene containing hydrolysable silane-groups is present adjacent to the first layer.

6. The cable according to claim 3, wherein the cable is a power cable.

7. A polyethylene composition comprising
   (A) an ethylene copolymer containing 76.1 wt % to 98.8 wt % ethylene and monomer units with hydrolysable silane groups, and
   (B) one or more ethylene co-polymers wherein at least one hydroxyl group and at least one (meth-)acrylate group are present in the same monomer;
   wherein component (B) is present in the polyethylene composition in an amount so that the monomer units having at least one hydroxyl group and at least one (meth) acrylate group are present in the polyethylene composition in an amount of 0.14 mol % or more and 7 mol % or less; and
   wherein components (A) and (B) may be present in the composition as separate ethylene co-polymers or as one ethylene co-polymer containing the respective groups simultaneously and wherein component (B) is present in an amount of 4 wt % or more of the total polyethylene composition.

8. A method for producing a cable, comprising:
   producing a first cable layer comprising a polyethylene composition comprising an ethylene co-polymer wherein at least one hydroxyl group and at least one (meth-)acrylate group are present in the same monomer; wherein the monomer units having at least one hydroxyl group and at least one (alkyl-)acrylate groups are present in the polyethylene composition in an amount of 0.14 mol % or more and 7 mol % or less;
   adhering the first cable layer to a second cable layer comprising a polyurethane resin.

9. The method of claim 8, wherein the ethylene co-polymer contains monomers having methyl-, ethyl-, propyl- or butyl acrylate groups.

10. The method of claim 8, wherein the ethylene co-polymer further contains monomer units with hydrolysable silane groups.

11. The method of claim 10, wherein in the ethylene co-polymer the monomer units with hydrolysable silane groups are present in an amount of 0.1 to 1 mol. %.

12. The method of claim 10, wherein the monomer units with hydrolysable silane groups comprise vinyl trimethoxysilane, vinyl dimethoxyethoxysilane, vinyl triethoxysilane, gamma-(meth) acryloxypropyltrimethoxysilane, gamma (meth)acryloxypropyltriethoxysilane, and/or vinyl triacetoxysilane.

13. The method of claim 10, wherein the monomer units with hydrolysable silane groups comprise vinyl trimethoxysilane.

* * * * *